US007246000B2

(12) United States Patent
Odagawa et al.

(10) Patent No.: US 7,246,000 B2
(45) Date of Patent: Jul. 17, 2007

(54) HARSH BRAKING WARNING SYSTEM AND METHOD, VEHICLE WARNING APPARATUS AND METHOD UTILIZING SAME, INFORMATION TRANSMITTING APPARATUS AND METHOD UTILIZING THE SYSTEM AND METHOD, SERVER APPARATUS, PROGRAM FOR THE SYSTEM AND INFORMATION RECORDING MEDIUM FOR SUCH A PROGRAM

(75) Inventors: Satoshi Odagawa, Tsurugashima (JP); Fumio Matsushita, Tsurugashima (JP); Takehiko Shioda, Tsurugashima (JP); Katsunori Arakawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 131 days.

(21) Appl. No.: 10/850,396

(22) Filed: May 21, 2004

(65) Prior Publication Data

US 2004/0245853 A1 Dec. 9, 2004

(30) Foreign Application Priority Data

May 22, 2003 (JP) .......................... P2003-144658

(51) Int. Cl.
*G06F 19/00* (2006.01)
*G08G 1/16* (2006.01)

(52) U.S. Cl. ........................ 701/70; 701/301; 303/191; 340/901; 340/902; 342/455

(58) Field of Classification Search ................ 701/301, 701/70; 303/191; 340/901, 902; 342/455
See application file for complete search history.

(56) References Cited

U.S. PATENT DOCUMENTS 4,706,086 A * 11/1987 Panizza ...................... 340/902
6,263,282 B1 * 7/2001 Vallancourt ................. 701/301
6,275,773 B1 * 8/2001 Lemelson et al. .......... 701/301
6,317,691 B1 * 11/2001 Narayan et al. ............ 701/301
6,359,571 B1 * 3/2002 Endo et al. ................. 340/988
6,498,976 B1 * 12/2002 Ehlbeck et al. ............... 701/70
6,502,035 B2 * 12/2002 Levine ........................ 701/301
6,570,532 B2 * 5/2003 Mise et al. .............. 342/357.1
6,650,252 B2 * 11/2003 Miller, Jr. ................... 340/989

(Continued)

FOREIGN PATENT DOCUMENTS

JP 6-147907 A 5/1997

*Primary Examiner*—Thomas Black
*Assistant Examiner*—Marie A Weiskopf
(74) *Attorney, Agent, or Firm*—Sughrue Mion, PLLC

(57) ABSTRACT

An apparatus is provided that warns a vehicle of a harsh braking-applied vehicle based on information sent from the harsh braking-applied vehicle. The apparatus includes a reception device, a position detection device, a forward side vehicle judgment device, and a warning device. The reception device receives the information indicating that harsh braking has been applied to the harsh braking-applied vehicle and information indicating a position of the harsh braking-applied vehicle. The position detection device detects a position of the vehicle to be warned, and the forward side vehicle judgment device determines if the harsh braking-applied vehicle is in front of the vehicle to be warned based on the positions of the harsh braking-applied vehicle and the vehicle to be warned. The warning device warns the vehicle to be warned when the harsh braking-applied vehicle is in front of the vehicle to be warned.

7 Claims, 11 Drawing Sheets

U.S. PATENT DOCUMENTS 6,856,883 B2 * 2/2005 Traylor ........................ 701/70
2003/0055596 A1 * 3/2003 Studt et al. ................. 702/150
2003/0102997 A1 * 6/2003 Levin et al. .................. 342/57
2005/0065682 A1 * 3/2005 Kapadia et al. ............... 701/35

* cited by examiner

HARSH BRAKING WARNING SYSTEM AND METHOD, VEHICLE WARNING APPARATUS AND METHOD UTILIZING SAME, INFORMATION TRANSMITTING APPARATUS AND METHOD UTILIZING THE SYSTEM AND METHOD, SERVER APPARATUS, PROGRAM FOR THE SYSTEM AND INFORMATION RECORDING MEDIUM FOR SUCH A PROGRAM

BACKGROUND OF THE INVENTION

1. Field of the Invention

The present invention relates to harsh braking warning system and method, vehicle warning apparatus and method utilizing such system and method, information transmitting apparatus and method utilizing such system and method, a server apparatus utilized in such system, a program for such a system and an information recording medium for such a program.

2. Related Art

When traffic congestion is caused on the front side of a driver's own vehicle, which is currently driving, harsh braking may be applied to any preceding vehicle. There may be a danger that the driver's own vehicle collides with the preceding vehicle to which the harsh braking has been applied.

In view of such a problem, the rearmost vehicle in the traffic congestion may drive with its flasher on, to cause succeeding vehicles to recognize the traffic congestion, especially on a freeway. Such an operation makes it possible to prevent harsh braking form being applied to the succeeding vehicle, thus avoiding a danger of collision.

Alternatively, the driver's own vehicle that is currently driving may receive traffic congestion information provided from a VICS (Vehicle Information Communication System), etc. through a navigation apparatus or a radio set mounted on the vehicle, as described in Japanese Laid-Open Patent Application No. H6-147907. According to such a system, the driver of the vehicle can recognize previously an occurrence of the traffic congestion and a position thereof, thus enabling the driver to make preparations in advance, for example, to keep a safe distance between the vehicles. Accordingly, even when the harsh braking is applied to the preceding vehicle, the driver can take an appropriate action in his/her own vehicle, thus avoiding a danger of collision.

However, operating the flasher to cause the other drivers to recognize the existence of the traffic congestion is carried out in accordance with a common courtesy or a prevailing custom, all the drivers do not always carry out such an operation.

Even when the traffic congestion information is received through the VICS in the latter case, the driver of his/her own vehicle cannot recognize the position of the position of the rearmost vehicle, thus making it impossible to avoid completely a danger of collision.

In addition, there exist more obstructions on general roads in comparison with freeways, and there are more situations in which harsh braking is to be applied. However, the above-described measures to avoid the danger of collision are hardly taken on the open roads. Accordingly, there is no option but to keep such a safety distance between the vehicles that any appropriate action can be taken when the harsh braking is applied to the preceding vehicle, in order to avoid a danger of collision.

SUMMARY OF THE INVENTION

An object of the present invention, which was made in view of the above-described problems, is therefore to provide harsh braking warning system and method, which permits to give, when harsh braking has been applied to a preceding vehicle, a warning of existence of such a harsh braking-applied vehicle, as well as vehicle warning apparatus and method utilizing such system and method, information transmitting apparatus and method utilizing such system and method, a server apparatus utilized in such system, a program for such a system and an information recording medium for such a program.

In order to attain the aforementioned object, a harsh braking-applied vehicle warning apparatus according to one of the aspects of the present invention, which is to give a warning of existence of a harsh braking-applied vehicle to which harsh braking was applied, to a vehicle to be warned, on a basis of a harsh braking information sent from the harsh braking-applied vehicle, said apparatus comprises: a reception device for receiving the harsh braking information, said harsh braking information including information, which is indicative that the harsh braking has been applied to said harsh braking-applied vehicle, and another information, which is indicative of a position of the harsh braking-applied vehicle; a position detection device for detecting a position of the vehicle to be warned; a forward side vehicle judgment device for judging as whether or not said harsh braking-applied vehicle is a preceding vehicle, which drives in front of the vehicle to be warned, on a basis of the position of said harsh braking-applied vehicle and the position of said vehicle to be warned; and a warning device for giving a warning of existence of said harsh braking-applied vehicle to said vehicle to be warned, when it is judged that said harsh braking-applied vehicle is said preceding vehicle.

The apparatus may further comprises: a distance calculation device for calculating distance between said harsh braking-applied vehicle and said vehicle to be warned, on a basis of the position of said harsh braking-applied vehicle and the position of said vehicle to be warned, and wherein: said warning device gives the warning at a level, which varies in accordance with said distance.

The harsh braking information may further include another information, which is indicative of a driving velocity of said harsh braking-applied vehicle, and said apparatus may further comprises: a velocity detection device for detecting a driving velocity of said vehicle to be warned; and a reaching time-calculating device for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, and wherein: said warning device gives the warning at a level, which varies in accordance with said period of time.

The warning device may give the warning at a level, which varies in accordance with at least one of a weather condition and a road surface condition.

In order to attain the aforementioned object, a harsh braking information transmitting apparatus according to another aspect of the present invention, for transmitting a harsh braking information from a harsh braking-applied vehicle to which harsh braking was applied, to a vehicle to be warned, to give a warning of existence of said harsh braking-applied vehicle, said apparatus comprises: a position detection device for detecting a position of said harsh braking-applied vehicle; a harsh braking detection device for detecting that the harsh braking has been applied to said harsh braking-applied vehicle; and a transmission device for transmitting, when application of the harsh braking is detected, the harsh braking information, which includes information indicative of the application of the harsh braking in said harsh braking-applied vehicle, and another information indicative of the position of said harsh braking-applied vehicle.

The harsh braking detection device may judge that the harsh braking has been applied, when acceleration that is not more than a predetermined value is detected.

The harsh braking detection device may judge that the harsh braking has been applied, when an ABS (Antilock Brake System) is operated.

The transmission device may broadcast-transmit said harsh braking information to an indefinite number of vehicle to be warned.

The transmission device may transmit said harsh braking information to a server apparatus, which transmits said harsh braking information to said vehicle to be warned.

The harsh braking information may include information of a harsh braking-applied vehicle-driving link, which is indicative of a place in which said harsh braking-applied vehicle is currently driving, in links that are indicative of roads on map data.

The harsh braking information may include information of velocity of said harsh braking-applied vehicle.

In order to attain the aforementioned object, a server apparatus according to another aspect of the present invention, for receiving the harsh braking information transmitted from the harsh braking information transmitting apparatus as claimed in Claim 9, said server apparatus comprises: a reception device for receiving said harsh braking information; and a transmission device for transmitting said harsh braking information as received to the vehicle to be warned.

The reception device may receive information of a positional relationship between the harsh braking-applied vehicle and other vehicle; and said server apparatus may further comprise a near vehicle specifying device for specifying said other vehicle, which exists in a place distant from said harsh braking-applied vehicle by a predetermined distance, as a near vehicle; and wherein: said transmission device transmits said harsh braking information to said near vehicle.

The server apparatus may be a communication control apparatus for controlling communication of a base station for a public radio communication network; said base station may serve as said reception device; and said transmission device may transmit said harsh braking information to all vehicles in a communication area of said base station.

In order to attain the aforementioned object, a harsh braking warning system according to another aspect of the present invention, comprises: the above-mentioned harsh braking-applied vehicle warning apparatus and the above-mentioned harsh braking information transmitting apparatus.

In order to attain the aforementioned object, a harsh braking warning system according to another aspect of the present invention, comprises: the above-mentioned harsh braking-applied vehicle warning apparatus and the above-mentioned server apparatus.

In order to attain the aforementioned object, a harsh braking-applied vehicle warning method according to another aspect of the present invention, which is to give a warning of existence of a harsh braking-applied vehicle to which harsh braking was applied, to a vehicle to be warned, on a basis of a harsh braking information sent from the harsh braking-applied vehicle, said method comprises: a reception step for receiving the harsh braking information, said harsh braking information including information, which is indicative that the harsh braking has been applied to said harsh braking-applied vehicle, and another information, which is indicative of a position of the harsh braking-applied vehicle; a position detection step for detecting a position of the vehicle to be warned; a forward side vehicle judgment step for judging as whether or not said harsh braking-applied vehicle is a preceding vehicle, which drives in front of the vehicle to be warned, on a basis of the position of said harsh braking-applied vehicle and the position of said vehicle to be warned; and a warning step for giving a warning of existence of said harsh braking-applied vehicle to said vehicle to be warned, when it is judged that said harsh braking-applied vehicle is said preceding vehicle.

In order to attain the aforementioned object, a harsh braking information transmitting method according to another aspect of the present invention, for transmitting a harsh braking information from a harsh braking-applied vehicle to which harsh braking was applied, to a vehicle to be warned, to give a warning of existence of said harsh braking-applied vehicle, said method comprises: a position detection step for detecting a position of said harsh braking-applied vehicle; a harsh braking detection step for detecting that the harsh braking has been applied to said harsh braking-applied vehicle; and a transmission step for transmitting, when application of the harsh braking is detected, the harsh braking information, which including information indicative of the application of the harsh braking in said harsh braking-applied vehicle, and another information indicative of the position of said harsh braking-applied vehicle.

In order to attain the aforementioned object, a harsh braking warning method according to another aspect of the present invention, is to transmit a harsh braking information from a harsh braking-applied vehicle to which harsh braking was applied to a vehicle to be warned, to give a warning of existence of the harsh braking-applied vehicle, to the vehicle to be warned, on a basis of the harsh braking information, said method comprises: a position detection step for detecting a position of said harsh braking-applied vehicle; a harsh braking detection step for detecting that the harsh braking has been applied to said harsh braking-applied vehicle; a transmission step for transmitting, when application of the harsh braking is detected, the harsh braking information, which includes information indicative of the application of the harsh braking in said harsh braking-applied vehicle, and another information indicative of the position of said harsh braking-applied vehicle; a reception step for receiving the harsh braking information in said vehicle to be warned; a position detection step for detecting a position of the vehicle to be warned; a forward side vehicle judgment step for judging as whether or not said harsh braking-applied vehicle is a preceding vehicle, which drives in front of the vehicle to be warned, on a basis of the position of said harsh braking-applied vehicle and the position of said vehicle to be warned; and a warning step for giving a warning of existence of said harsh braking-applied vehicle to said vehicle to be warned, when it is judged that said harsh braking-applied vehicle is said preceding vehicle.

In order to attain the aforementioned object, a harsh braking-applied vehicle warning program, according to another aspect of the present invention, is to be executed by a computer included in a harsh braking-applied vehicle warning apparatus that is to give a warning of existence of a harsh braking-applied vehicle to which harsh braking was applied, to a vehicle to be warned, on a basis of a harsh braking information sent from the harsh braking-applied vehicle, to cause the computer to function as: a reception device for receiving the harsh braking information, said harsh braking information including information, which is indicative that the harsh braking has been applied to said harsh braking-applied vehicle, and another information, which is indicative of a position of the harsh braking-applied vehicle; a position detection device for detecting a position of the vehicle to be warned; a forward side vehicle judgment device for judging as whether or not said harsh braking-applied vehicle is a preceding vehicle, which drives in front of the vehicle to be warned, on a basis of the position of said harsh braking-applied vehicle and the position of said vehicle to be warned; and a warning device for giving a warning of existence of said harsh braking-applied vehicle to said vehicle to be warned, when it is judged that said harsh braking-applied vehicle is said preceding vehicle.

In order to attain the aforementioned object, a harsh braking information transmitting program according to another aspect of the present invention, is to be executed by a computer included in a harsh braking information transmitting apparatus, for transmitting a harsh braking information from a harsh braking-applied vehicle to which harsh braking was applied, to a vehicle to be warned, to give a warning of existence of said harsh braking-applied vehicle, to cause the computer to function as: a position detection device for detecting a position of said harsh braking-applied vehicle; a harsh braking detection device for detecting that the harsh braking has been applied to said harsh braking-applied vehicle; and a transmission device for transmitting, when application of the harsh braking is detected, the harsh braking information, which includes information indicative of the application of the harsh braking in said harsh braking-applied vehicle, and another information indicative of the position of said harsh braking-applied vehicle.

In order to attain the aforementioned object, an information recording medium according to another aspect of the present invention, has the above-mentioned program recorded thereon so as to be readable by the computer.

DESCRIPTION OF THE PREFERRED EMBODIMENTS

Now, embodiments of the present invention will be described in detail below with reference to the accompanying drawings. In the embodiments described below, the present invention is applied to a navigation apparatus mounted on a vehicle.

[I] First Embodiment

The first embodiment of the present invention is directed to a harsh braking warning system in which a harsh braking information is transmitted directly from a vehicle to which harsh braking has been applied (hereinafter referred to as the "harsh braking-applied vehicle") $C_B$ to another vehicle (hereinafter referred to as the "vehicle to be warned") $C_W$.

[1-1] Harsh Braking Warning System

Figure 1:
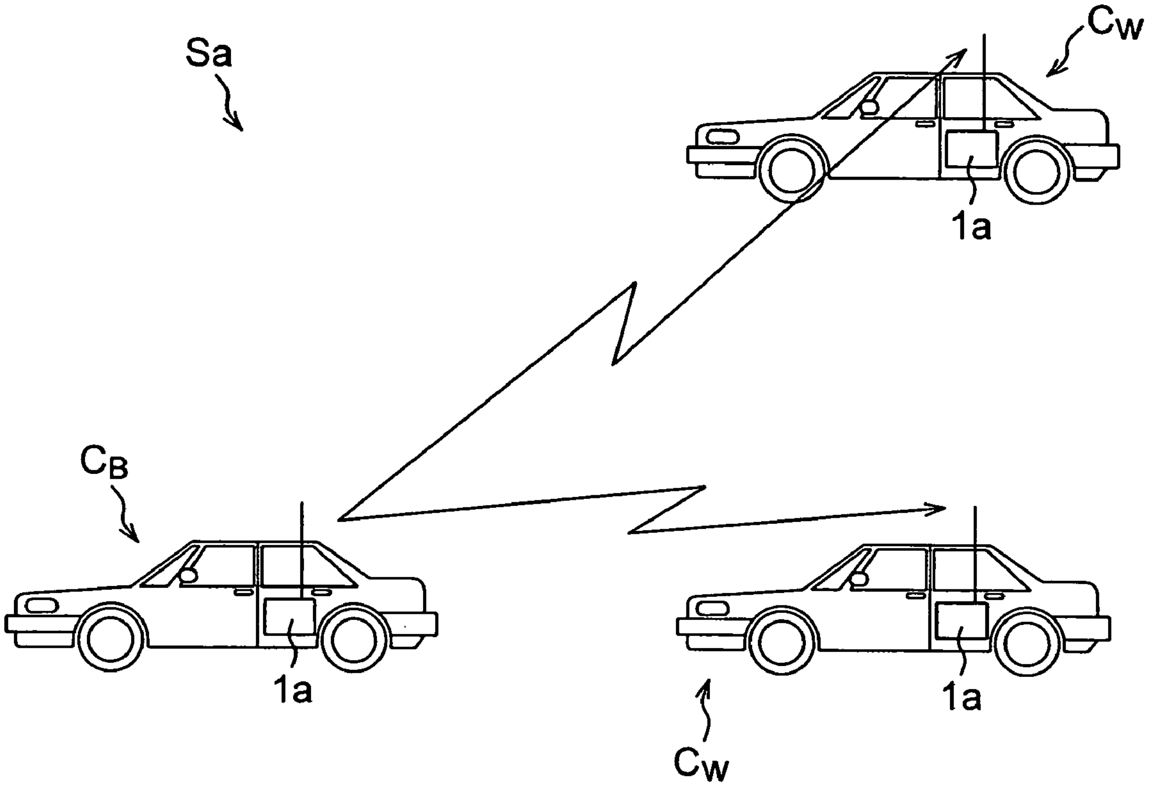
FIG. 1 is a schematic descriptive view illustrating the whole configuration of a harsh braking warning system according to the first embodiment of the present invention.

FIG. 1 is a schematic descriptive view illustrating the whole configuration of a harsh braking warning system Sa according to the first embodiment of the present invention.

As shown in FIG. 1, the harsh braking warning system Sa includes navigation apparatuses 1*a*, which are mounted on a plurality of vehicles C ($C_B$, $C_W$). The navigation apparatus 1*a* has not only the same functions as the known navigation apparatus, but also another functions of serving as a harsh braking information transmitting apparatus and a harsh braking-applied vehicle warning apparatus, as mentioned later.

In the harsh braking warning system Sa, when harsh braking has been applied to any one $C_B$ of the plurality of vehicles C, the navigation apparatus 1*a* mounted on the harsh braking-applied vehicle $C_B$ transmits the harsh braking information to the vehicles to be warned $C_W$. Then, the navigation apparatus 1*a* of the vehicles to be warned $C_W$ receive the harsh braking information, and give a warning of existence of the harsh braking-applied vehicle, as an occasion demands. In this case, the navigation apparatus 1*a* of the harsh braking-applied vehicle $C_B$ serves as the harsh braking information transmitting apparatus, on the one hand, and the navigation apparatus 1*a* of the vehicles to be warned $C_W$ serve as the harsh braking-applied vehicle warning apparatus. Detailed description of the navigation apparatus 1*a* and operation of the harsh braking warning system Sa will be given later.

[1-2] Navigation Apparatus

Figure 2:
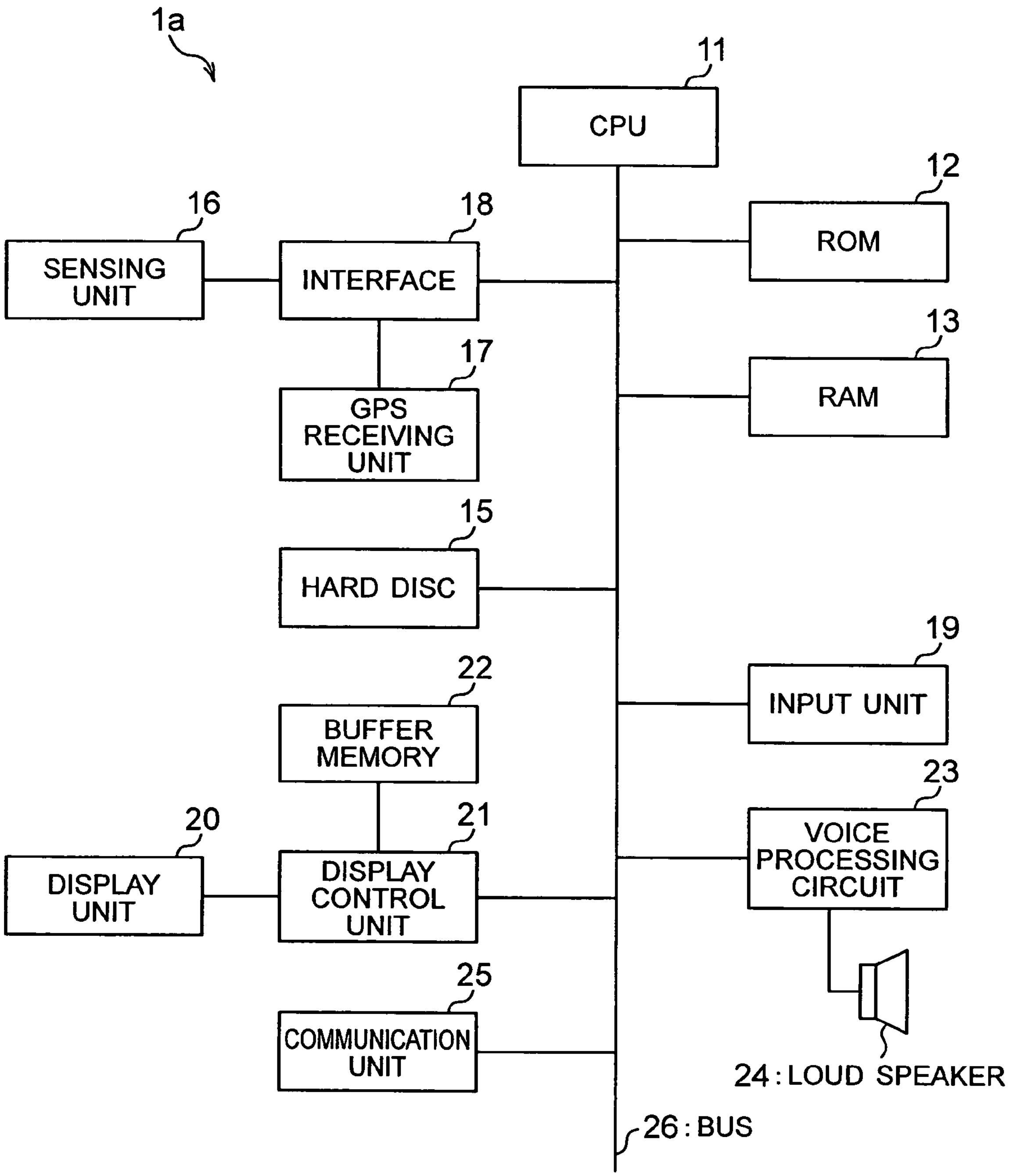
FIG. 2 is a block diagram showing the whole configuration of a navigation apparatus according to the first embodiment of the present invention.

FIG. 2 is a block diagram showing the whole configuration of the navigation apparatus 1*a*.

As shown in FIG. 2, the navigation apparatus 1*a* according to the first embodiment of the present invention includes a CPU (Central Processing Unit) 11, a ROM (Read Only Memory) 12, a RAM (Random Access Memory) 13, a DVD/CD-ROM (Digital Versatile Disc-Read Only Memory) drive 14, a hard disc 15, a sensing unit 16, a GPS (Global Positioning System) receiving unit 17, an interface 18, an input unit 19, a display unit 20, a display control unit 21, a buffer memory 22, a voice processing circuit 23, a loudspeaker 24, a communication unit 25 and a bus 26.

As shown in FIG. 2, the CPU 11 controls the whole operation of the navigation apparatus 1*a*. The CPU 11, which is connected to the respective elements of the navigation apparatus 1*a* through the bus 26, reads a control program stored in the ROM 12 to execute the program, and temporarily stores the data currently processed in the RAM 13. The control programs stored in the ROM 12 includes programs, which cause the CPU 11 to serve as at least one of a reception device, a position detection device, a preceding vehicle judgment device, a warning device, a distance calculating device, a velocity detection device, a reaching time-calculating device, a harsh braking detection device and a transmission device. The CPU 11 reads this program to execute it, and then serves as at least one of the reception device, the position detection device, the preceding vehicle judgment device, the warning device, the distance calculating device, the velocity detection device, the reaching time-calculating device, the harsh braking detection device and the transmission device.

The DVD/CD-ROM drive 14 carries out a reading operation of various kinds of information stored in the DVD/CD-ROM 26. The DVD/CD-ROM 26 stores map information, load information (including link information), etc. Here, a "link" means a section (i.e., link) connecting two points (i.e., nodes) to each other on the loads in the map information. Accordingly, specification of a link along which a certain vehicle drives leads to specification of a determined load on which the vehicle is currently driving, a determined place, at which it is currently driving, and a determined direction along which it is currently driving.

The hard disc 15 is a non-volatile memory device, which performs reading and writing operation of the map information and the load information.

The sensing unit 16 detects a driving velocity, acceleration and an azimuth of the vehicle. More specifically, the sensing unit 16 is composed for example of a driving velocity sensor for detecting the driving velocity and the acceleration, and of a gyro for detecting the azimuth.

The GPS receiving unit 17 receives radio waves from GPS satellites and outputs GPS data. The CPU 11 comprehensively detects the current position of the driving vehicle on the basis of outputs from the sensing unit 16 and the GPS data from the GPS receiving unit 17.

The interface 18 carries out an interface operation between the CPU 11 and each of the sensing unit 16 and the GPS receiving unit 17, so that the own vehicle information is obtained based on the outputs from the sensing unit 16 and the GPS data from the GPS receiving unit 17, under the control of the CPU 11. The own vehicle information is subjected to a map matching processing to be matched with the above-mentioned map data and corrected under the control of the CPU 11.

The sensing unit 16, the GPS receiving unit 17 and the interface 18 serve as at least one of the position detection device and the velocity detection device.

An input device 19, which includes keys provided in a main body for the navigation system, or a remote controller provided with keys, supplies signals corresponding to the keys to the CPU 11, to execute a predetermined mode of the navigation operation.

The display unit 20, which is a display device utilized for the navigation operation, includes for example of a CRT or a liquid crystal display element. The map data are displayed in various modes on the display unit 20 under the control of the display control unit 21, and the current position of the vehicle and the positions of many facilities are superimposed on the map data.

The display control unit 21 generates display data, which are to be displayed on the display unit 20, and reads the display data from the buffer memory 22 at the predetermined timing, while temporarily storing such display data in the bugger memory 22, to output the data to the display unit 20.

The voice processing circuit 23 generates the predetermined voice signals under the control of the CPU 11. The voice signals are amplified to an appropriate level by the voice processing circuit 23, and outputted externally from the loudspeaker 24. Such voice signals include voice guidance for the route guidance of the vehicle and another voice guidance of a position and contents of facilities.

The display unit 20 and/or the loudspeaker 24 serve as the entirety or a part of the warning device.

The communication unit 25 transmits externally information, which has been generated by the CPU 11, and receives the other information, which has been transmitted wirelessly from external equipment, and then supplies it to the CPU 11.

[1-3] Operation of the Harsh Braking Warning System

Figure 3:
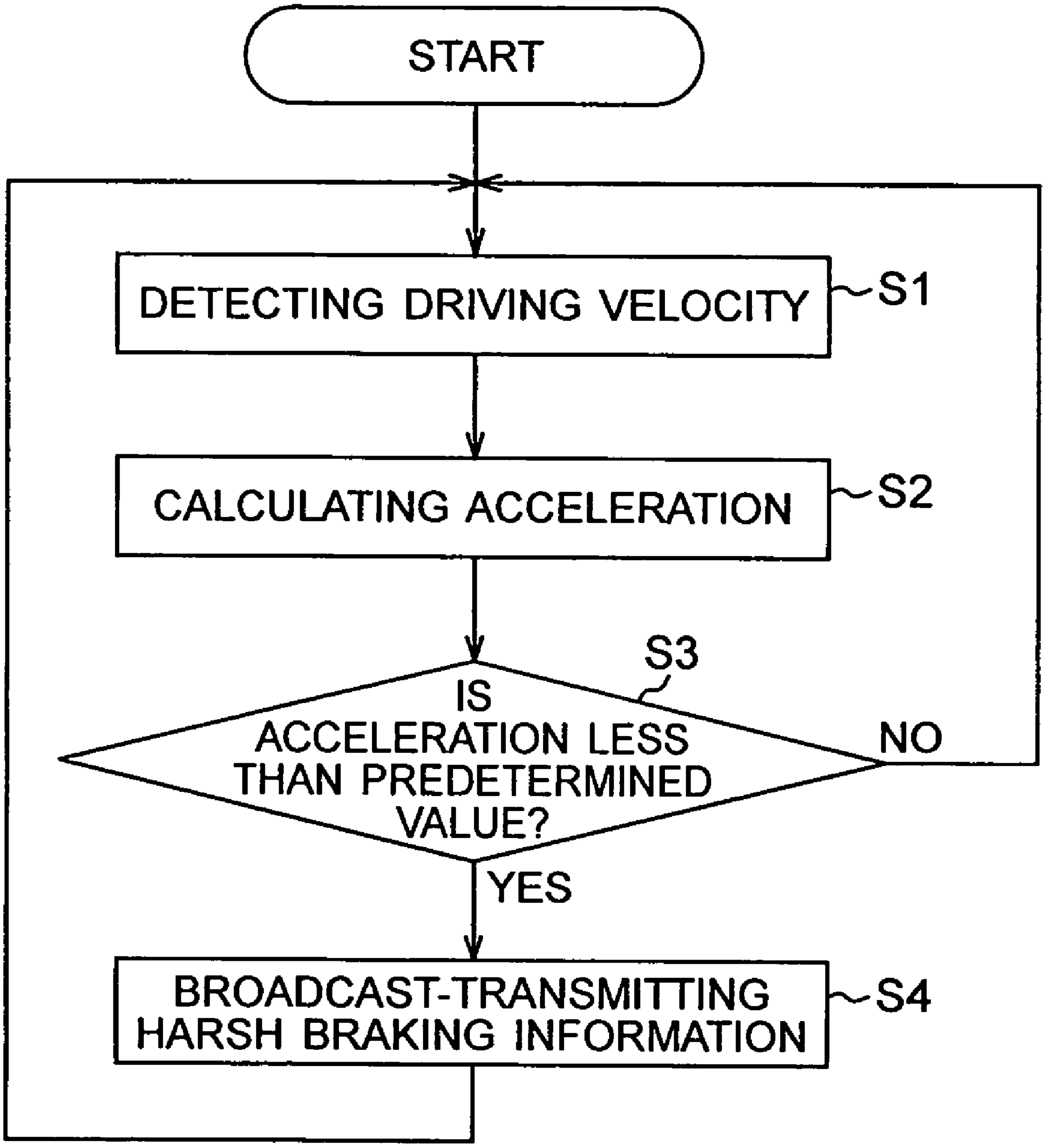
FIG. 3 is a view showing processing procedures in a harsh braking-applied vehicle according to the first embodiment of the present invention.
Figure 4:
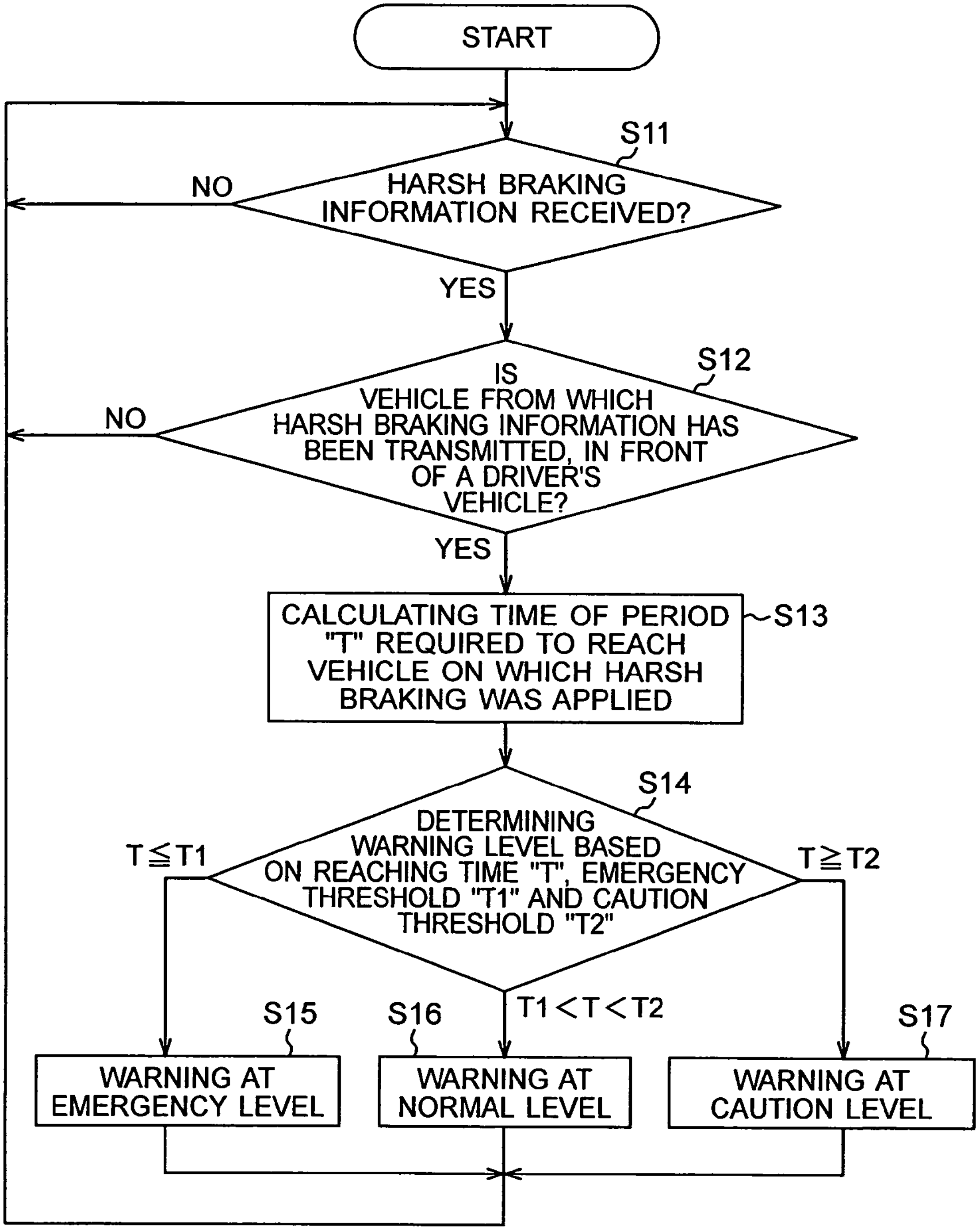
FIG. 4 is a view showing processing procedures in a vehicle to be warned according to the first embodiment of the present invention.

Now, operation of the harsh braking warning system Sa will be described with reference to FIGS. 3 and 4. The processing in the harsh braking-applied vehicle $C_B$ and the processing in the vehicle to be warned $C_W$ will be described separately from each other.

[1-3-1] Processing in the Harsh Braking-Applied Vehicle

First, description will be given below of the processing procedures in the navigation apparatus 1*a* mounted on the harsh braking-applied vehicle (i.e., the vehicle to which the harsh braking has been applied) $C_B$, with reference to FIG. 3.

The navigation apparatus 1*a* always detects the driving velocity "v" of the own vehicle (i.e., the harsh braking-applied vehicle) $C_B$ (Step S1). More specifically, the navigation apparatus 1*a* causes the sensing unit 16 to detect the driving velocity "v" of the own vehicle at predetermined small time intervals of "Δt". The driving velocity "v" as detected is outputted to the CPU 11 through the interface 18.

Then, the navigation apparatus 1*a* calculates acceleration "α" of the own vehicle (Step S2). More specifically, the navigation apparatus 1*a* calculates, in the CPU 11, a driving velocity variation amount "Δv" (Δv=Δ2−Δ1) from the driving velocity "v1" at the time "t1" and the driving velocity "V2" at the time "t2" (t2=t1+Δt), and then, divides the driving velocity variation amount "Δv" by the small time intervals of "Δt" to obtain the acceleration "α".

The calculation of the acceleration "α" is not limited only to the above-mentioned calculation. The acceleration "α" may be calculated based on radio waves received by the GPS receiving unit 17. More specifically, in such a case, the GPS receiving unit 17 calculates the velocity and direction of movement of the own vehicle, utilizing frequency shift of the received radio wave due to the Doppler effect. The acceleration "α" of the own vehicle is calculated in the form of variation ratio of the velocity of movement. In an actual case, the acceleration "α" is calculated by the formula, (Vb−Va)/Δt, wherein "Va" being the velocity at the time of the previous reception of the radio wave, "Vb" being the velocity at the time of the current reception thereof and "Δt" being the reception interval.

Then, the navigation apparatus 1*a* judges as whether or not the acceleration "α" calculated in Step S2 is not more than a reference value "C" utilized in judgment of the harsh braking (Step S3). More specifically, in the navigation apparatus 1*a*, the ROM 12 stores the reference value previously set, and the CPU 11 judges as whether or not the acceleration "α" calculated in Step S2 is not more than the reference value "C". In case where it is judged that the acceleration "a" is not more than the reference value "C", it is then judged that the harsh braking has been applied to the own vehicle, and the processing enters Step S4. In case where it is judged that the acceleration "α" is more than the reference value "C", it is then judged that the harsh braking has not been applied to the own vehicle, and the processing returns to Step S1.

The standard value "C" that serves as a value (threshold) of the acceleration "α" for judgment as whether or not the harsh braking has been applied to the own vehicle, is determined as follows. More specifically, according to a certain observation, when the harsh braking is applied to a vehicle with the ABS, which includes two occupants in the front seats and is driving at a speed of 100 km/h, a required distance to stop the vehicle is about 45 meters and the acceleration is −8.57 m/s·s. According to the other observation, the required distance to stop the vehicle driving at the speed of 50 km/h is 11.25 meter, because such a distance is in inverse proportion to the square of the velocity, and the acceleration is −8.57 m/s·s. Accordingly, the acceleration when applying the harsh braking becomes almost constant, irrespective of the driving velocity when applying the harsh braking. As a result, it is possible to set the standard value "C" within the range of from −9 m/s·s to −5 m/s·s, so as to reasonably judge that the harsh braking has been applied.

When it is judged that the acceleration "α" is not more than the standard value "C" (YES in Step S3), the navigation apparatus 1*a* broadcast-transmits the harsh braking information to the other vehicle (i.e., the vehicles to be warned $C_W$) (Step S4). More specifically, in the navigation apparatus 1*a*, the CPU 11 controls the communication unit 25 to broadcast-transmit the harsh braking information to the other vehicles.

The braking information, which includes at least the positional information of the harsh braking-applied vehicle, is information indicative of the fact that the harsh braking has been applied. The braking information may further include the driving velocity and acceleration of the harsh braking-applied vehicle, and, of information indicative of the roads on the map data, all of or a part of information indicative of a link along which the vehicle is driving, as an occasion demands.

In the embodiment as described above, judgment of application of the harsh braking is made based on the condition that the acceleration "α" is not more than the standard value "C". Alternatively, judgment of application of the harsh braking may be made based on operation of the ABS. More specifically, the ABS operates when the harsh braking is applied. Accordingly, detection of a driving signal of the ABS makes it possible to judge that the harsh braking has been applied.

[1-3-2] Processing in the Vehicle to be Warned

Now, description will be given below of the processing procedures in the navigation apparatus 1*a* mounted on the vehicle to be warned $C_W$ (i.e., the vehicle to receive the harsh braking information), with reference to FIG. 4. In the processing, the navigation apparatus 1*a* serves as the harsh braking-applied vehicle warning apparatus, as mentioned above.

First, the navigation apparatus 1*a* judges as whether or not the harsh braking information has been received (Step S11). More specifically, the navigation apparatus 1*a* supplies the information, which has been received by the communication unit 25, to the CPU 11, and then, the CPU 11 judges as whether or not that information is the harsh braking information. In case where it is judged that the harsh braking information has been received, the processing enters Step S12. In case where it is judged that the harsh braking information has not been received, Step S11 is repeated.

When it is judged that the harsh braking information has been received (YES in Step S11), the navigation apparatus 1*a* then judges as whether or not the harsh braking-applied vehicle $C_B$ is a preceding vehicle, which is driving in front of the own vehicle (Step S12). More specifically, in the navigation apparatus 1*a*, the CPU 11 judges as whether or not the link along which the harsh braking-applied vehicle CB is driving is located in front of the link along which the own vehicle is driving, to make a judgment as whether or not the harsh braking-applied vehicle $C_B$ is a preceding vehicle, which is driving in front of the own vehicle. The "link located in front of the link" includes not only the link, which is located in front of the link along which the own vehicle is driving, but also any links, which are connected to the nodes on the driving direction of the own vehicle. In case where it is judged that the harsh braking-applied vehicle is driving in front of the own vehicle, the process enters Step S13. In case where it is judged that the harsh braking-applied vehicle is not driving in front of the own vehicle, the process returns to Step S11.

When it is judged that the harsh braking-applied vehicle $C_B$ is driving in front of the own vehicle (YES in Step S12), the navigation apparatus 1*a* calculates a period of time "T" required for the own vehicle to reach the position of the harsh braking-applied vehicle $C_B$. More specifically, in the navigation apparatus 1*a*, the CPU 11 calculates the distance "L" between the own vehicle and the harsh braking-applied vehicle $C_B$, based on the position of the harsh braking-applied vehicle, which is included in the harsh braking information, and the position of the own vehicle detected by the GPS receiving unit 17. The CPU 11 then calculates a period of time required for the own vehicle to drive the distance "L" (namely, the period of time "T" required for the own vehicle to reach the position of the harsh braking-applied vehicle $C_B$), based on the driving velocity "v" and acceleration "α" of the own vehicle. The period of time "T" is calculated for example by the following equation:

$$vT+\alpha T^2/2=L$$

Then, the navigation apparatus 1*a* determines a warning level based on the above-mentioned period of reaching time "T". More specifically, in the navigation apparatus 1*a*, the ROM 12 previously stores an emergency threshold "T1" according to which, when the period of reaching time "T" becomes not more than the threshold "T1", the situation is considered as an emergency level, on the one hand, and a caution threshold "T2" according to which, when the period of reaching time "T" becomes not less than the threshold "T2" (T1<T2), the situation is considered as a caution level, on the other hand. The CPU 11 judges a differential relationship between the period of reaching time "T" and each of the emergency threshold "T1" and the caution threshold "T2". In case where the period of reaching time "T" is not more than the emergency threshold "T1", it is determined that the "warning at the emergency level" should be given. In case where the period of reaching time "T" is more than the emergency threshold "T1" and less than the caution threshold "T2", it is determined that the "warning at the normal level" should be given. In case where the period of reaching time "T" is not less than the caution threshold "T2", it is determined that the "warning at the caution level" should be given.

At least one of weather conditions and road surface conditions may be considered, when determining the warning level. In this case, each of the emergency threshold "T1" and the caution threshold "T2" has previously been set for each of the weather conditions (i.e., "fine", "cloudy", "rainy", "snowy", etc.) and the road surface conditions (i.e., "paved", "unpaved", etc.). The emergency threshold "T1" and the caution threshold "T2" are specified based on the current weather conditions and the surface conditions of the road on which the own vehicle is driving, and the warning levels are determined in the same manner as described above. According to this optional feature, the weather conditions and the road surface conditions are considered, thus making it possible to determine more appropriately the warning levels. It is possible to acquire the weather condition information through the Web, for example from Japan Weather Association, and the road surface condition information from the traffic information.

Then, the navigation apparatus 1*a* gives the warning at the emergency level (Step S15), when it is determined in Step S14 that the warning should be given at the "emergency level", the warning at the normal level (Step S16), when it is determined in Step S14 that the warning should be given at the "normal level", and the warning at the caution level (Step S17), when it is determined in Step S14 that the warning should be given at the "caution level". More specifically, in the navigation apparatus 1*a*, the CPU 11 controls the display control unit 21 and/or the voice processing circuit 23 to give the warning at respective level through a visual information displayed on the display unit 20 and/or a voice information from the loudspeaker 24. After giving the warning, the processing returns to Step S11.

In the above-described embodiment, the warning level is determined on the basis of the period of reaching time "T". Alternatively, the warning level may be determined on the basis of the distance "L" between the own vehicle and the harsh braking-applied vehicle $C_B$. In this case, an emergency threshold "L1" and a caution threshold "L2" is determined, and the warning level is determined based on the differential relationship between the distance "L" and each of these thresholds "L1" and "L2". In addition, the weather conditions and the road surface conditions may be considered in determination of the warning level.

In the first embodiment as described above, the navigation apparatus 1*a*, which serves as the harsh braking-applied vehicle warning apparatus, includes the communication unit 25, which receives the harsh braking information including at least the information indicative of application of the harsh braking and the positional information of the harsh braking-applied vehicle, the CPU 11, which judges, based on the position of the harsh braking-applied vehicle and the position of the own vehicle, as whether or not the harsh braking-applied vehicle is driving in front of the own vehicle, and gives, when it is judged that the harsh braking-applied vehicle is driving in front of the own vehicle, the warning that the harsh braking-applied vehicle is existing in front of the own vehicle, to the vehicles to be warned, and the display unit 20 and/or the loudspeaker 24. Accordingly, it is possible to give the warning to the own vehicle, when the harsh braking-applied vehicle exists in front of the own vehicle, thus avoiding a danger of collision.

In addition, in the navigation apparatus 1*a*, the CPU 11 makes a judgment on the distance between the own vehicle and the harsh braking-applied vehicle, on the basis of the position of the own vehicle and the position of the harsh braking-applied vehicle, and gives the warning at the level, which varies in accordance with the above-mentioned distance, thus providing an appropriate warning in accordance with the level of danger. This makes it possible to prevent a driver of the own vehicle from making an excessively imminent response, when the warning is given for example at the caution level. Alternatively, it is possible to urge the driver to make an appropriate response to avoid the collision, when the warning is given for example at the emergency level.

Further, the navigation apparatus 1*a* gives the warning at the level, which varies in accordance with at least one of the weather conditions and the road surface conditions, thus providing a more appropriate warning in view of the weather conditions and the road surface conditions.

In addition, in the first embodiment of the present invention, the navigation apparatus 1*a*, which also serves as the harsh braking information transmitting apparatus, includes the GPS receiving unit 17 for detecting the position of the harsh braking-applied vehicle, the CPU 11 for detecting that the harsh braking has been applied to the harsh braking-applied vehicle, and the communication unit 25 for transmitting the harsh braking information, when the application of the harsh braking is detected. It is therefore possible to transmit, when the harsh braking has been applied to the own vehicle, the harsh braking information to the other vehicles, so as to enable the other vehicles to give the warning based on such information, thus avoiding a danger of collision.

[II] Second Embodiment

The second embodiment of the present invention is directed to a case where the harsh braking-applied vehicle $C_B$ transmits the harsh braking information to the vehicle to be warned $C_W$ through the server apparatus.

[2-1] Harsh Braking Warning System

Figure 5:
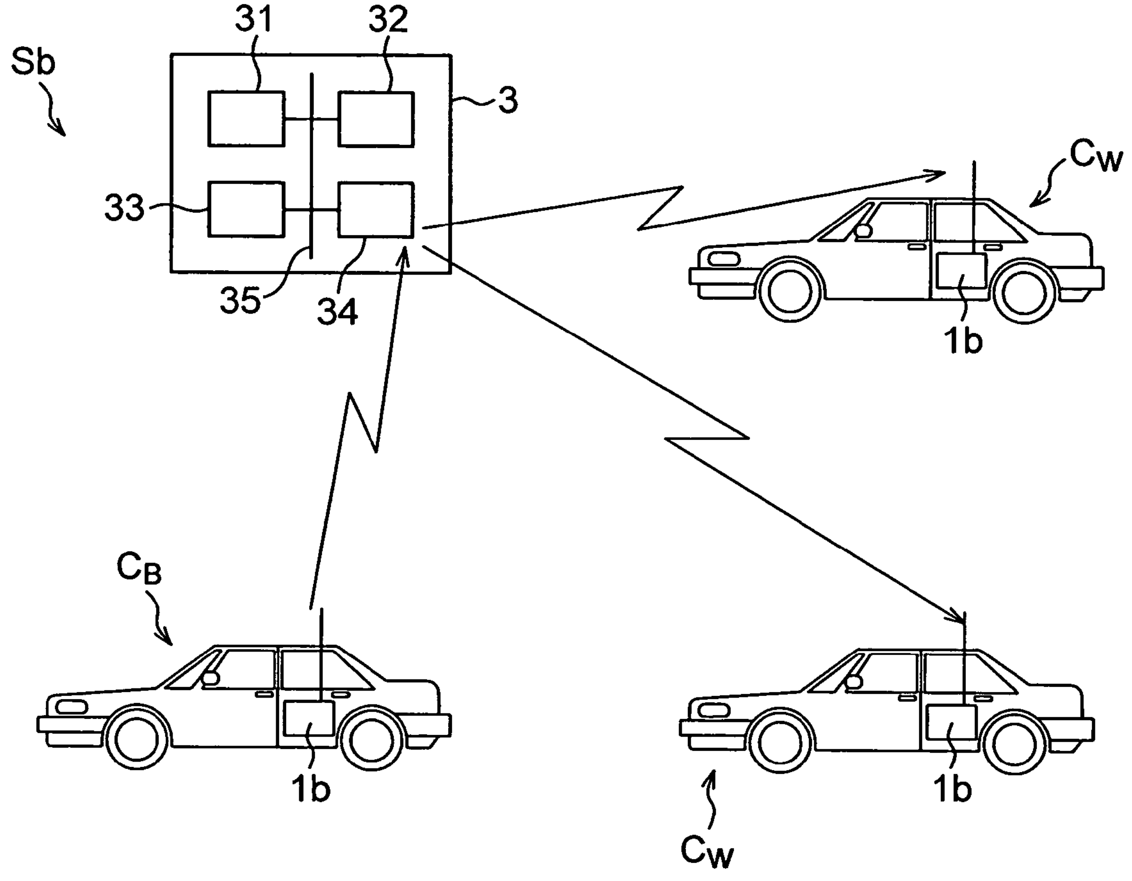
FIG. 5 is a schematic descriptive view illustrating the whole configuration of the harsh braking warning system according to the second embodiment of the present invention.

FIG. 5 is a schematic descriptive view illustrating the whole configuration of the harsh braking warning system Sb according to the second embodiment of the present invention.

As shown in FIG. 5, the harsh braking warning system Sb includes navigation apparatuses 1*a*, which are mounted on a plurality of vehicles C ($C_B$, $C_W$), and a server apparatus 3, which is wirelessly connected to the above-mentioned navigation apparatuses 1*a*. The navigation apparatus 1*a* has not only the same functions as the known navigation apparatus, but also another functions of serving as the harsh braking information transmitting apparatus and the harsh braking-applied vehicle warning apparatus, as mentioned later, in the same manner as the first embodiment of the present invention.

In the harsh braking warning system Sb, when harsh braking has been applied to any one $C_B$ of the plurality of vehicles C, the navigation apparatus 1*b* mounted on the harsh braking-applied vehicle $C_B$ transmits the harsh braking information to the server apparatus 3. The server apparatus 3 receives the harsh braking information and then transmits it to the vehicles to be warned $C_W$. Then, the navigation apparatus 1*b* of the vehicles to be warned $C_W$ receive the harsh braking information, and give a warning of existence of the harsh braking-applied vehicle. In this case, the navigation apparatus 1*b* of the harsh braking-applied vehicle $C_B$ serves as the harsh braking information transmitting apparatus, on the one hand, and the navigation apparatus 1*b* of the vehicles to be warned $C_W$ serve as the harsh braking-applied vehicle warning apparatus. Detailed description of the navigation apparatus 1*b* and operation of the harsh braking warning system Sb will be given later.

The navigation apparatuses 1*b* and the server apparatus 3 constitute not only the harsh braking warning system Sb, but also the communication navigation. More specifically, the navigation apparatus 1*b* always uploads information including a vehicle position, a driving velocity, acceleration, a driving link, etc. to the server apparatus 3. The server apparatus 3 transmits the map information and the road information corresponding to the information as uploaded to the navigation apparatuses 1*b*.

[2-2] Navigation Apparatus

The navigation apparatus 1*b* according to the second embodiment of the present invention is basically identical to the navigation apparatus 1*a* according to the first embodiment of the present invention. The same reference numerals are given to the same structural components, and description thereof is omitted.

[2-3] Server apparatus

The server apparatus includes a CPU 31, a ROM 32, a RAM 33, a communication unit 34 and a bus 35.

The CPU 31 controls the whole operation of the server apparatus 3. The CPU 31, which is connected to the respective elements of the server apparatus 3 through the bus 35, reads a control program stored in the ROM 32 to execute the program, and temporarily stores the data currently processed in the RAM 33. The control programs stored in the ROM 32 includes a program, which causes the CPU 31 to serve as a whole or part of the transmitted vehicle selection device. The CPU 31 reads this program to execute it, and then serves as the whole or part of the transmitted vehicle selection device.

The communication unit 34 is to communicate with the navigation apparatuses 1*b* by a wireless connection (e.g., a wireless LAN, a transceiver, a CB (citizen band) and an amateur radio). The communication unit 34 serves as a transmission device and a reception device.

[2-4] Operation of the Harsh Braking Warning System

Figure 6:
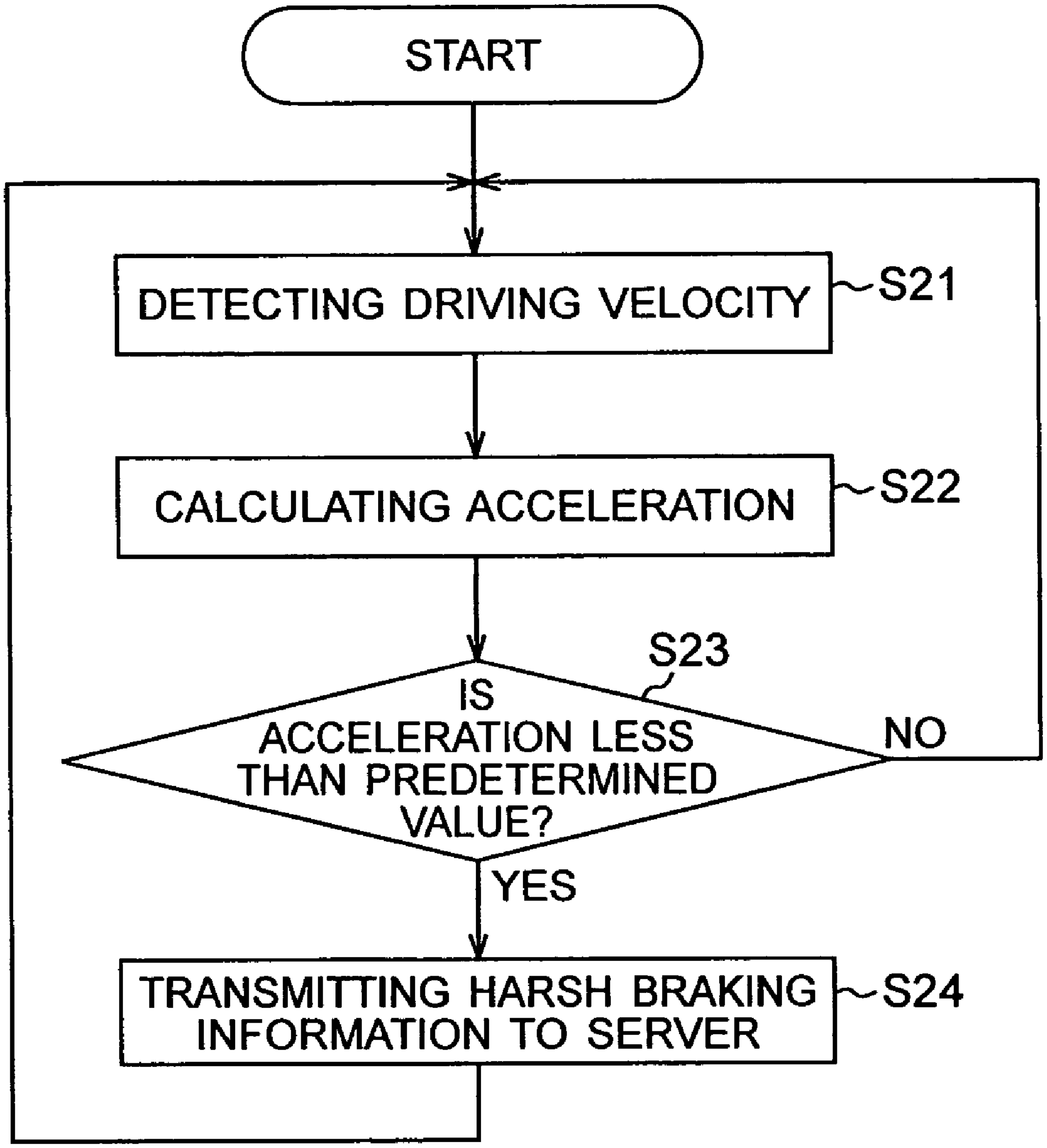
FIG. 6 is a view showing processing procedures in the harsh braking-applied vehicle according to the second embodiment of the present invention.
Figure 7:
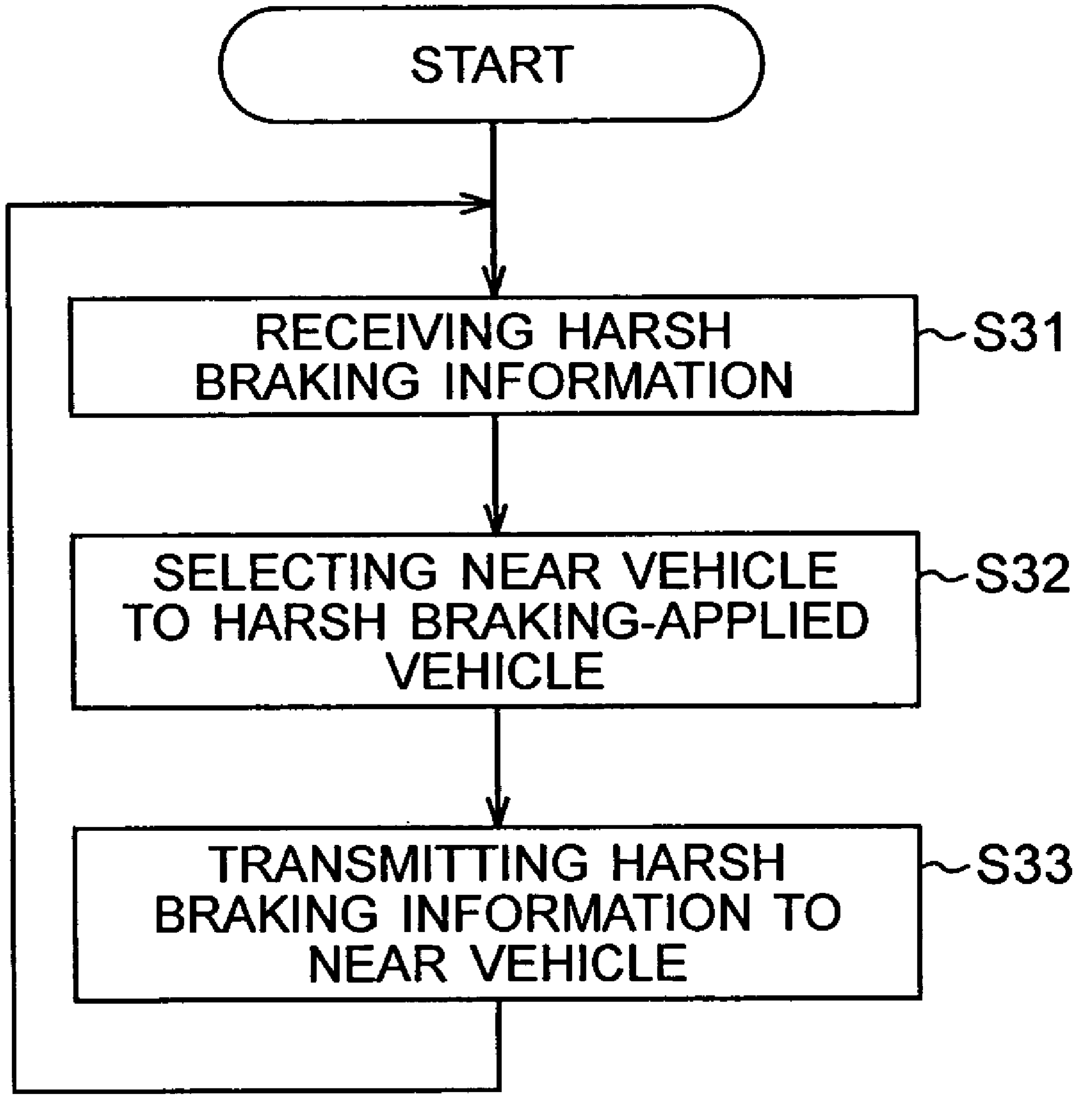
FIG. 7 is a view showing processing procedures in a server apparatus according to the second embodiment of the present invention.

Now, operation of the harsh braking warning system Sb will be described with reference to FIGS. 6 and 7. The processing in the harsh braking-applied vehicle $C_B$, the processing in the server apparatus, and the processing in the vehicle to be warned $C_W$ will be described separately from each other. Description of the same processing as the first embodiment of the present invention is omitted.

[2-4-1] Processing in the Harsh Braking-Applied Vehicle

First, description will be given below of the processing procedures in the navigation apparatus 1*b* mounted on the harsh braking-applied vehicle (i.e., the vehicle to which the harsh braking has been applied) $C_B$, with reference to FIG. 6.

The navigation apparatus 1*b* always detects the driving velocity "v" of the own vehicle (i.e., the harsh braking-applied vehicle) $C_B$ (Step S21).

Then, the navigation apparatus 1*b* calculates acceleration "α" of the own vehicle (Step S22).

Then, the navigation apparatus 1*b* judges as whether or not the acceleration "a" calculated in Step S22 is not more than a reference value "C" utilized in judgment of the harsh braking (Step S23). In case where it is judged that the acceleration "α" is not more than the reference value "C", it is then judged that the harsh braking has been applied to the own vehicle, and the processing enters Step S24. In case where it is judged that the acceleration "α" is more than the reference value "C", it is then judged that the harsh braking has not been applied to the own vehicle, and the processing returns to Step S21.

When it is judged that the acceleration "α" is not more than the standard value "C" (YES in Step S23), the navigation apparatus 1*b* transmits the harsh braking information to the server apparatus 3 (Step S24). More specifically, in the navigation apparatus 1*b*, the CPU 11 controls the communication unit 25 to transmit the harsh braking information to the server apparatus 3. The contents of the braking information are the same as those in the first embodiment of the present invention.

[2-4-2] Processing in the Server Apparatus

Now, description will be given below of the processing procedures in the server apparatus 3 with reference to FIG. 7.

First, the server apparatus 3 receives the harsh braking information (Step S31). More specifically, the communication unit 34 of the server apparatus 3 receives the harsh braking information, and then supplies the information to the CPU 31.

Then, the server apparatus 3 selects a vehicle, which is located near to the harsh braking-applied vehicle $C_B$, and to which the harsh braking information is to be transmitted (Step S32). More specifically, the server apparatus 3 selects the vehicle, which is located within the predetermined distance from the harsh braking-applied vehicle CB, as a near vehicle, on the basis of the position of the harsh braking-applied vehicle included in the harsh braking information, and the positions of the vehicles as uploaded from the navigation apparatuses 1*b* of the respective vehicles. The predetermined distance, which means a distance as previously set to select the vehicle to which the warning of existence of the harsh braking-applied vehicle should be given, as the near vehicle, is set for example as a distance from 700 m to 1200 m for a freeway, and a distance from 200 m to 400 m for a general road.

Then, the server apparatus 3 transmits the harsh braking information to the vehicle as selected in Step S32 (Step S33). More specifically, in the server apparatus 3, the CPU 31 controls the communication unit 34 to transmit the harsh braking information to the vehicle as selected in Step S32.

[2-4-3] Processing in the Vehicle to be Warned

The processing procedures in the navigation apparatus 1*b* mounted on the vehicle to be warned $C_W$ (i.e., the vehicle to receive the harsh braking information) are identical to those in the first embodiment of the present invention, and description thereof is omitted.

In the second embodiment of the present invention, the navigation apparatus 1*b* serving as the harsh braking-applied vehicle warning apparatus provides the same technical effects as the navigation apparatus 1*a* according to the first embodiment of the present invention.

In the second embodiment of the present invention, the navigation apparatus 1*b*, which serves as the harsh braking information transmitting apparatus, includes the GPS receiving unit 17 for detecting the position of the harsh braking-applied vehicle, the CPU 11 for detecting that the harsh braking has been applied to the harsh braking-applied vehicle, and the communication unit 25 for transmitting, when the application of the harsh braking is detected, the harsh braking information to the server apparatus, which is to transmit the harsh braking information to the vehicle to be warned. It is therefore possible to transmit, when the harsh braking has been applied to the own vehicle, the harsh braking information to the server apparatus 3, which transmits the harsh braking information to the near vehicles, so as to enable the near vehicles, which have received the harsh braking information, to give the warning based on such information, thus avoiding a danger of collision.

In addition, in the second embodiment of the present invention, the server apparatus 3 includes the communication unit 34, which receives the harsh braking information from the harsh braking-applied vehicle and also receives information of the positions of the respective vehicles therefrom, and the CPU 31, which specifies the other vehicle, which is located in the predetermined distance from the harsh braking-applied vehicle, as the near vehicle, on the basis of the positions of the harsh braking-applied vehicle and the other vehicles, and the above-mentioned communication unit 34 also transmits the harsh braking information to the near vehicle. It is therefore possible to transmit reliably the harsh braking information to the near vehicle, which requires the harsh braking information, so as to enable the near vehicle to give the warning based on such information, thus avoiding a danger of collision.

[III] Third Embodiment

The third embodiment of the present invention is directed to a case where the harsh braking-applied vehicle $C_B$ transmits the harsh braking information to the vehicle to be warned $C_W$ through a base station for a public radio communication network.

[3-1] Harsh Braking Warning System

Figure 8:
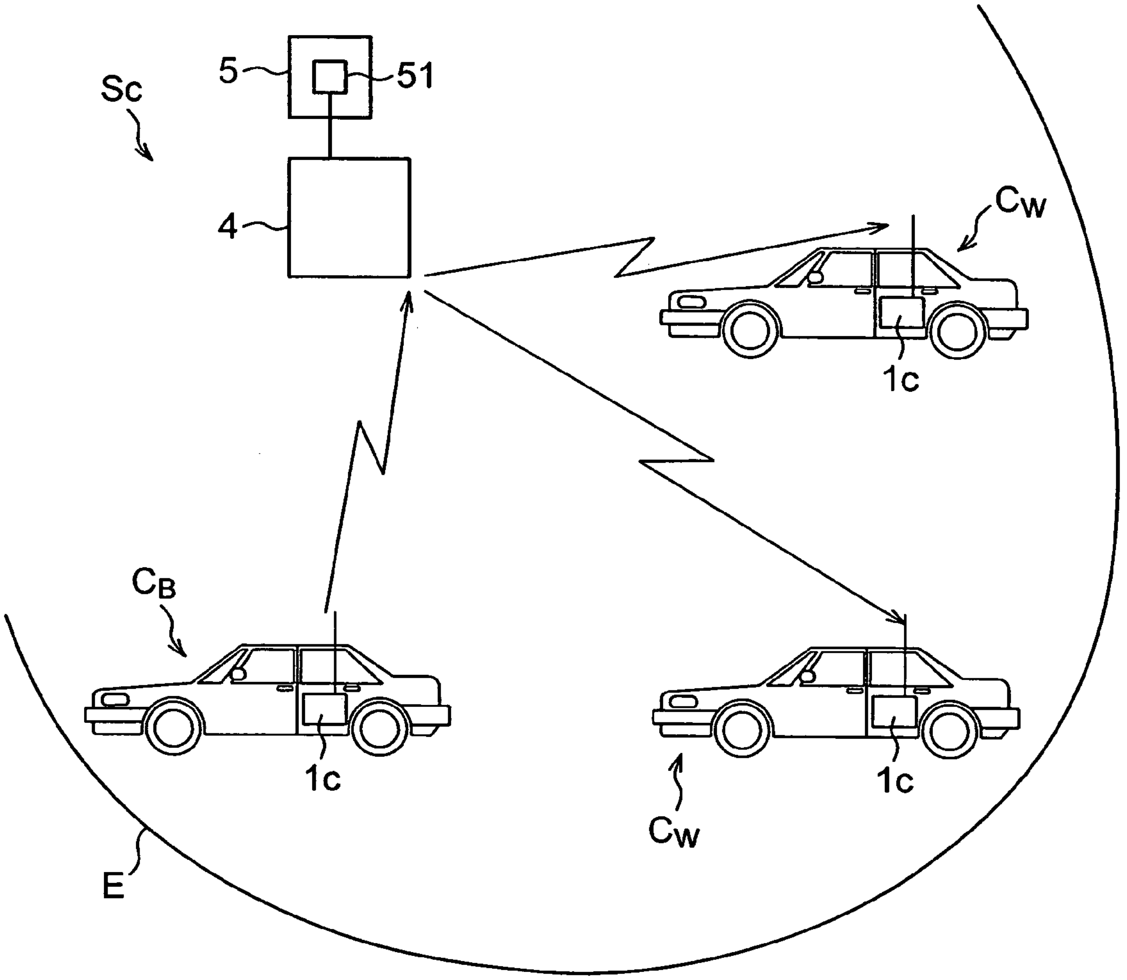
FIG. 8 is a schematic descriptive view illustrating the whole configuration of the harsh braking warning system according to the third embodiment of the present invention.

FIG. 8 is a schematic descriptive view illustrating the whole configuration of the harsh braking warning system Sc according to the third embodiment of the present invention.

As shown in FIG. 8, the harsh braking warning system Sc includes navigation apparatuses 1*c*, which are mounted on a plurality of vehicles C ($C_B$, $C_W$), a base station 4 in a public radio communication network, which is wirelessly connected to the above-mentioned navigation apparatuses 1*c*, and a communication control unit 5 for controlling the communication with the base station 4.

The base station 4 for the public radio communication includes a base station for a communication network of cellular phones to which a communication system such as a TDMA (time division multiple access) system and a CDMA (code-division multiple access) system is applied, and a base station for a communication network of PHS (personal handyphone system) to which a communication system of PHS is applied.

[3-2] Navigation Apparatus

The navigation apparatus 1*c* according to the third embodiment of the present invention is basically identical to the navigation apparatus 1*a* according to the first embodiment of the present invention. The same reference numerals are given to the same structural components, and description thereof is omitted.

[3-3] Base Station and a Control Unit

Figure 9:
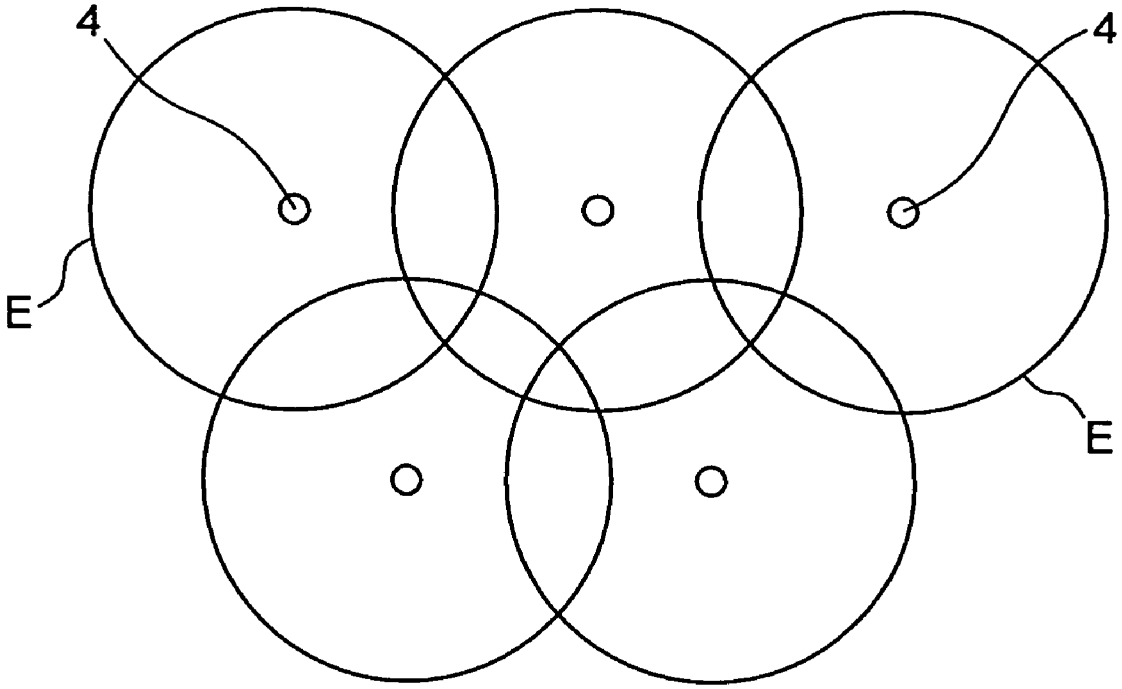
FIG. 9 is a view illustrating arrangement of base stations according to the third embodiment of the present invention.

The base station 4, which is a known base station for public radio communication, communicates with the navigation apparatuses 1*c*, which are located in a communication area (cell) "E" of the base station 4. A plurality of base stations 4 is provided so that the cells of them are partially overlapped with each other (see FIG. 9).

The communication control unit 5 is provided with a computer 51, which analyzes contents of information received by the base station 4, and controls the base station 4 to transmit, when the information as received is the harsh braking information, the harsh braking information to the navigation apparatuses 1*c*, which are located in the same cell.

[4-4] Operation of the Harsh Braking Warning System

Figure 10:
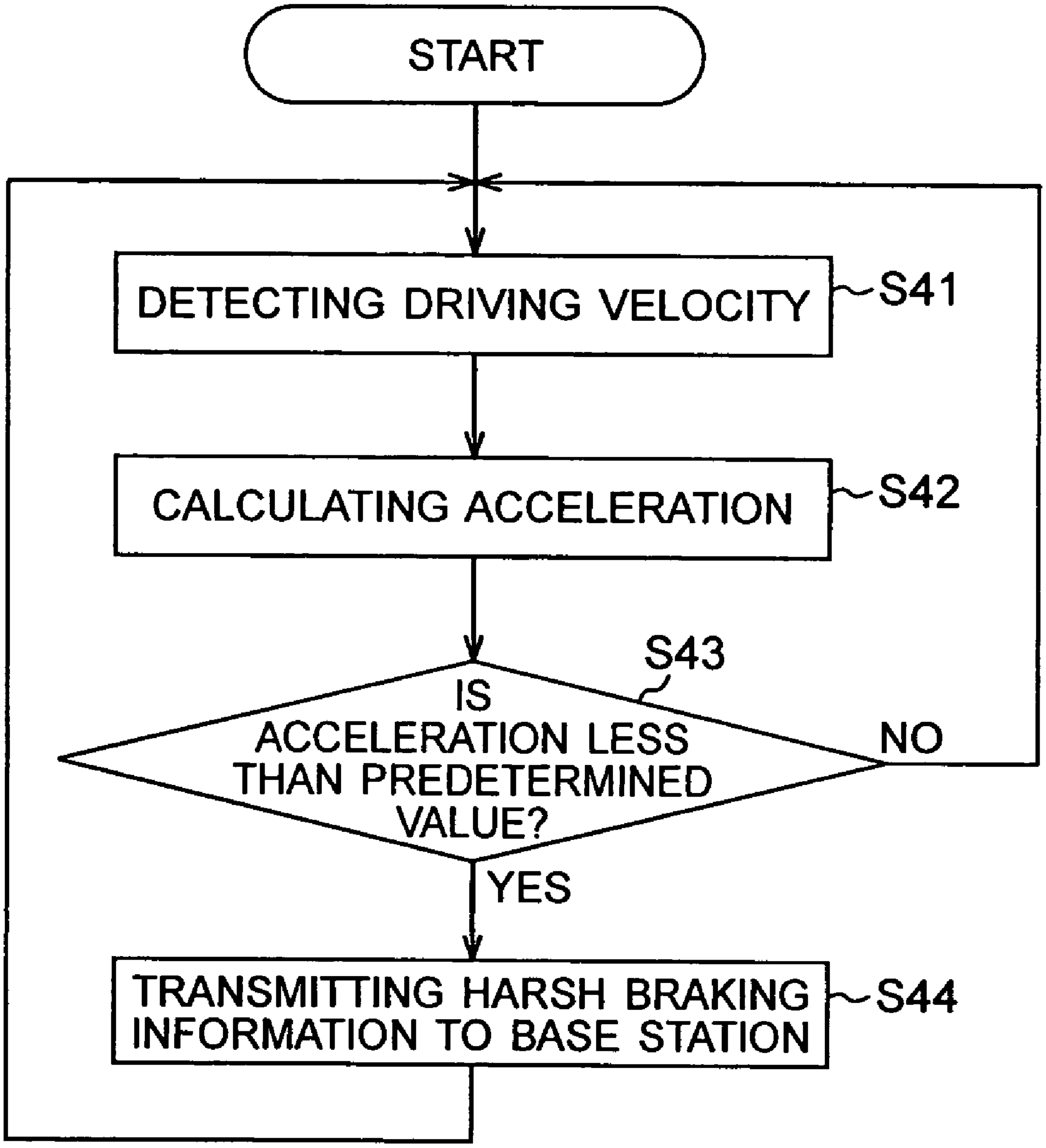
FIG. 10 is a view showing processing procedures in the harsh braking-applied vehicle according to the third embodiment of the present invention.
Figure 11:
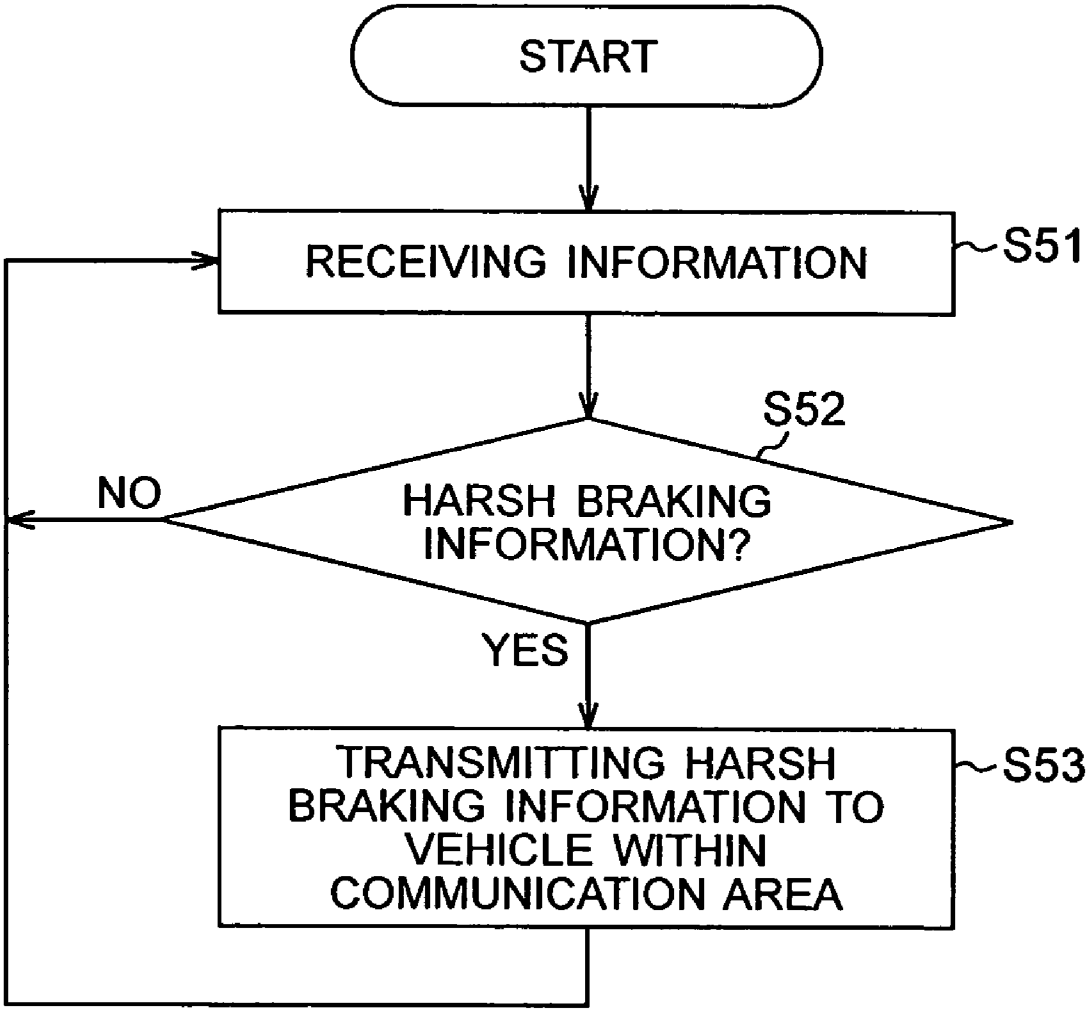
FIG. 11 is a view showing processing procedures in the base station according to the third embodiment of the present invention.

Now, operation of the harsh braking warning system Sc will be described with reference to FIGS. 10 and 11. The processing in the harsh braking-applied vehicle $C_B$, the processing in the base station and the processing in the vehicle to be warned $C_W$ will be described separately from each other. Detailed description of the same processing as the first embodiment of the present invention is omitted.

[3-4-1] Processing in the Harsh Braking-Applied Vehicle

First, description will be given below of the processing procedures in the navigation apparatus 1*c* mounted on the harsh braking-applied vehicle (i.e., the vehicle to which the harsh braking has been applied) $C_B$, with reference to FIG. 10.

The navigation apparatus 1*c* always detects the driving velocity "v" of the own vehicle (i.e., the harsh braking-applied vehicle) $C_B$ (Step S41).

Then, the navigation apparatus 1*c* calculates acceleration "α" of the own vehicle (Step S42).

Then, the navigation apparatus 1*c* judges as whether or not the acceleration "α" calculated in Step S42 is not more than a reference value "C" utilized in judgment of the harsh braking (Step S43). In case where it is judged that the acceleration "α" is not more than the reference value "C", it is then judged that the harsh braking has been applied to the own vehicle, and the processing enters Step S44. In case where it is judged that the acceleration "α" is more than the reference value "C", it is then judged that the harsh braking has not been applied to the own vehicle, and the processing returns to Step S41.

When it is judged that the acceleration "α" is not more than the standard value "C" (YES in Step S43), the navigation apparatus 1*c* transmits the harsh braking information to the base station 4 (Step S44). More specifically, in the navigation apparatus 1*c*, the CPU 11 controls the communication unit 25 to transmit the harsh braking information to the base station 4. The contents of the braking information are the same as those in the first embodiment of the present invention.

[3-4-2] Processing in the Base Station

Now, description will be given below of the processing procedures in the base station 4 with reference to FIG. 11.

First, the base station 4 receives information as transmitted (Step S51). More specifically, the base station 4 receives the information as transmitted and then supplies the information to the computer 51 of the communication control unit 5.

Then, the base station 4 judges as whether or not the information received by the base station 4 is the harsh braking information (Step S52). More specifically, in the communication control unit 5, the computer 51 analyzes the contents of the information as received and judges as whether or not the above-mentioned information is the harsh braking information. In case where it is judged that the information as received is the harsh braking information (YES in Step S52), the processing enters Step S53. In case where it is judged that the information as received is not the harsh braking information (NO in Step S52), the processing returns to Step S51.

When it is judges that the base station 4 has received the harsh braking information, the communication control unit 5 controls the base station 4 to transmit the harsh braking information to the navigation apparatuses 1*c*, which are located in the cell (Step S53).

[3-4-3] Processing in the Vehicle to be Warned

The processing procedures in the navigation apparatus 1*c* mounted on the vehicle to be warned $C_W$ (i.e., the vehicle to receive the harsh braking information) are identical to those in the first embodiment of the present invention, and description thereof is omitted.

In the third embodiment of the present invention, the navigation apparatus 1*c* serving as the harsh braking-applied vehicle warning apparatus provides the same technical effects as the navigation apparatus 1*a* according to the first embodiment of the present invention.

In the third embodiment of the present invention, the navigation apparatus 1*c*, which serves as the harsh braking information transmitting apparatus, includes the GPS receiving unit 17 for detecting the position of the harsh braking-applied vehicle, the CPU 11 for detecting that the harsh braking has been applied to the harsh braking-applied vehicle, and the communication unit 25 for transmitting, when the application of the harsh braking is detected, the harsh braking information to the base station 4, which is to transmit the harsh braking information to the vehicle to be warned. It is therefore possible to transmit, when the harsh braking has been applied to the own vehicle, the harsh braking information to the base station 4, which transmits the harsh braking information to a near vehicle that is located near the harsh braking-applied vehicle, so as to enable the near vehicles, which have received the harsh braking information, to give the warning based on such information, thus avoiding a danger of collision.

In addition, in the third embodiment of the present invention, eh base station 4 receives the harsh braking information from the harsh braking-applied vehicle, and transmits the harsh braking information to all the vehicles that are located within the communication area "E" of the base station 4. It is therefore possible to transmit reliably the harsh braking information to the vehicles that are located within the communication area "E" and requires the harsh braking information, and then enables the vehicles within the communication area "E" to give the warning on the basis of the harsh braking information, thus avoiding a danger of collision.

[IV] Other Embodiment

In the embodiments of the present invention as described above, the navigation apparatus serves as the harsh braking-applied vehicle warning apparatus and the harsh braking information transmitting apparatus. The present invention is not limited only to such embodiments. The harsh braking-applied vehicle warning apparatus and the harsh braking information transmitting apparatus may be provided separately from the navigation apparatus. The harsh braking-applied vehicle warning apparatus and the harsh braking information transmitting apparatus may be provided independently from each other.

In the embodiments of the present invention as described above, the warning level is divided into three stages, i.e., the emergency level, the normal level and the caution level. The present invention is not limited only to such embodiments. The warning level may be divided into two stages, or four stages or more. The warning may merely be given, without providing any warning levels.

In the embodiments of the present invention as described above, it is judged, in the vehicle to be warned, as whether or not the harsh braking-applied vehicle is a preceding vehicle, which drives in front of the vehicle to be warned. However, such a decision may be made in the harsh braking-applied vehicle, the server apparatus or the control unit. More specifically, the harsh braking-applied vehicle, the server apparatus or the control unit may judge, when transmitting the harsh braking information, as whether or not a vehicle to which the information is transmitted, is a vehicle by which the harsh braking-applied vehicle is followed, and transmit the harsh braking information only to the vehicle to be warned, i.e., the vehicle by which the harsh braking-applied vehicle is followed. In this case, the above-mentioned judgment is not required in the vehicle to be warned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-144658 filed on May 22, 2003 including the specification, claims, drawings and summary is incorporated herein by reference in its entirety.

What is claimed is:

1. A harsh braking-applied vehicle warning apparatus, which is to give a warning of existence of a harsh braking-applied vehicle to which harsh braking was applied, to a vehicle to be warned, on a basis of a harsh braking information sent from the harsh braking-applied vehicle, said apparatus comprising:

a reception device for receiving the harsh braking information, said harsh braking information including information, which is indicative that the harsh braking has been applied to said harsh braking-applied vehicle, and another information, which is indicative of a position of the harsh braking-applied vehicle;

a position detection device for detecting a position of the vehicle to be warned;

a forward side vehicle judgment device for judging as whether or not said harsh braking-applied vehicle is a preceding vehicle, which drives in front of the vehicle to be warned, on a basis of the position of said harsh braking-applied vehicle and the position of said vehicle to be warned;

a warning device for giving a warning of existence of said harsh braking-applied vehicle to said vehicle to be warned, when it is judged that said harsh braking-applied vehicle is said preceding vehicle; and a distance calculation device for calculating distance between said harsh braking-applied vehicle and said vehicle to be warned, on a basis of the position of said harsh braking-applied vehicle and the position of said vehicle to be warned, wherein said warning device gives the warning at a level, which varies in accordance with said distance, wherein said harsh braking information further includes another information, which is indicative of a driving velocity of said harsh braking-applied vehicle;

a velocity detection device for detecting a driving velocity of said vehicle to be warned; and a reaching time-calculating device for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, wherein said warning device gives the warning at a level, which varies in accordance with said period of time.

2. The apparatus as claimed in claim 1, wherein:

said warning device gives the warning at a level, which varies in accordance with at least one of weather conditions and road surface conditions.

3. A harsh braking warning system, comprising:

(i) a harsh braking-applied vehicle warning apparatus, which is to give a warning of existence of a harsh braking-applied vehicle to which harsh braking was applied, to a vehicle to be warned, on a basis of a harsh braking information sent from the harsh braking-applied vehicle, said apparatus comprising:

a reception device for receiving the harsh braking information, said harsh braking information including information, which is indicative that the harsh braking has been applied to said harsh braking-applied vehicle, and another information, which is indicative of a position of the harsh braking-applied vehicle;

a position detection device for detecting a position of the vehicle to be warned;

a forward side vehicle judgment device for judging as whether or not said harsh braking-applied vehicle is a preceding vehicle, which drives in front of the vehicle to be warned, on a basis of the position of said harsh braking-applied vehicle and the position of said vehicle to be warned;

a warning device for giving a warning of existence of said harsh braking-applied vehicle to said vehicle to be warned, when it is judged that said harsh braking-applied vehicle is said preceding vehicle; and a distance calculation device for calculating distance between said harsh braking-applied vehicle and said vehicle to be warned, on a basis of the position of said harsh braking-applied vehicle and the position of said vehicle to be warned, wherein:

said warning device gives the warning at a level, which varies in accordance with said distance; and (ii) a harsh braking information transmitting apparatus, for transmitting the harsh braking information from the harsh braking-applied vehicle to which harsh braking was applied, to the vehicle to be warned, to give the warning of existence of said harsh braking-applied vehicle, said apparatus comprising:

a position detection device for detecting the position of said harsh braking-applied vehicle;

a harsh braking detection device for detecting that the harsh braking has been applied to said harsh braking-applied vehicle; and a transmission device for transmitting, when application of the harsh braking is detected, the harsh braking information, which the includes information indicative of the application of the harsh braking in said harsh braking-applied vehicle, and the other information indicative of the position of said harsh braking-applied vehicle, said transmission device broadcast-transmits said harsh braking information to an indefinite number of vehicle to be warned, wherein said harsh braking information further includes another information, which is indicative of a driving velocity of said harsh braking-applied vehicle, and wherein said harsh braking-applied vehicle warning apparatus further comprises:

a velocity detection device for detecting a driving velocity of said vehicle to be warned; and a reaching time-calculating device for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, wherein said warning device gives the warning at a level, which varies in accordance with said period of time.

4. A harsh braking warning system, comprising:

(i) a harsh braking-applied vehicle warning apparatus, which is to give a warning of existence of a harsh braking-applied vehicle to which harsh braking was applied, to a vehicle to be warned, on a basis of a harsh braking information sent from the harsh braking-applied vehicle, said apparatus comprising:

a reception device for receiving the harsh braking information, said harsh braking information including information, which is indicative that the harsh braking has been applied to said harsh braking-applied vehicle, and another information, which is indicative of a position of the harsh braking-applied vehicle;

a position detection device for detecting a position of the vehicle to be warned;

forward side vehicle judgment device for judging as whether or not said harsh braking-applied vehicle is a preceding vehicle, which drives in front of the vehicle to be warned, on a basis of the position of said harsh braking-applied vehicle and the position of said vehicle to be warned;

a warning device for giving a warning of existence of said harsh braking-applied vehicle to said vehicle to be warned, when it is judged that said harsh braking-applied vehicle is said preceding vehicle; and a distance calculation device for calculating distance between said harsh braking-applied vehicle and said vehicle to be warned, on a basis of the position of said harsh braking-applied vehicle and the position of said vehicle to be warned, wherein:

said warning device gives the warning at a level, which varies in accordance with said distance; and (ii) a transmission device that transmits the harsh braking information to a server apparatus, which transmits said harsh braking information to said vehicle to be warned, wherein the server apparatus receives the harsh braking information transmitted from the harsh braking information transmitting apparatus, wherein said harsh braking information further includes another information, which is indicative of a driving velocity of said harsh braking-applied vehicle, and wherein said harsh braking-applied vehicle warning apparatus further comprises:

a velocity detection device for detecting a driving velocity of said vehicle to be warned; and reaching time-calculating device for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, and wherein said warning device gives the warning at a level, which varies in accordance with said period of time.

5. A harsh braking-applied vehicle warning method, which is to give a warning of existence of a harsh braking-applied vehicle to which harsh braking was applied, to a vehicle to be warned, on a basis of a harsh braking information sent from the harsh braking-applied vehicle, said method comprising:

a reception step for receiving the harsh braking information, said harsh braking information including information, which is indicative that the harsh braking has been applied to said harsh braking-applied vehicle, and another information, which is indicative of a position of the harsh braking-applied vehicle;

a position detection step for detecting a position of the vehicle to be warned;

a forward side vehicle judgment step for judging as whether or not said harsh braking-applied vehicle is a preceding vehicle, which drives in front of the vehicle to be warned, on a basis of the position of said harsh braking-applied vehicle and the position of said vehicle to be warned;

a warning step for giving a warning of existence of said harsh braking-applied vehicle to said vehicle to be warned, when it is judged that said harsh braking-applied vehicle is said preceding vehicle; and a distance calculation step for calculating distance between said harsh braking-applied vehicle and said vehicle to be warned, on a basis of the position of said harsh braking-applied vehicle and the position of said vehicle to be warned, wherein said warning step gives the warning at a level, which varies in accordance with said distance, wherein said harsh braking information further includes another information, which is indicative of a driving velocity of said harsh braking-applied vehicle;

a velocity detecting step for detecting a driving velocity of said vehicle to be warned; and a reaching time calculating step for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, wherein said warning step gives the warning at a level, which varies in accordance with said period of time.

6. A harsh braking warning method, which is to transmit a harsh braking information from a harsh braking-applied vehicle to which harsh braking was applied to a vehicle to be warned, to give a warning of existence of the harsh braking-applied vehicle, to the vehicle to be warned, on a basis of the harsh braking information, said method comprising:

a position detection step for detecting a position of said harsh braking-applied vehicle;

a harsh braking detection step for detecting that the harsh braking has been applied to said harsh braking-applied vehicle;

a transmission step for transmitting, when application of the harsh braking is detected, the harsh braking information, which includes information indicative of the application of the harsh braking in said harsh braking-applied vehicle, and another information indicative of the position of said harsh braking-applied vehicle, said transmission step comprising broadcast-transmitting said harsh braking information to an indefinite number of vehicle to be warned;

a reception step for receiving the harsh braking information in said vehicle to be warned;

a position detection step for detecting a position of the vehicle to be warned;

a forward side vehicle judgment step for judging as whether or not said harsh braking-applied vehicle is a preceding vehicle, which drives in front of the vehicle to be warned, on a basis of the position of said harsh braking-applied vehicle and the position of said vehicle to be warned; and a warning step for giving a warning of existence of said harsh braking-applied vehicle to said vehicle to be warned, when it is judged that said harsh braking-applied vehicle is said preceding vehicle, wherein said harsh braking information further includes another information, which is indicative of a driving velocity of said harsh braking-applied vehicle;

a velocity detection step for detecting a driving velocity of said vehicle to be warned; and a reaching time-calculating step for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, wherein said warning step gives the warning at a level, which varies in accordance with said period of time.

7. An information recording medium on which there is recorded a harsh braking-applied vehicle warning program, which is to be executed by a computer included in a harsh braking-applied vehicle warning apparatus that is to give a warning of existence of a harsh braking-applied vehicle to which harsh braking was applied, to a vehicle to be warned, on a basis of a harsh braking information sent from the harsh braking-applied vehicle, to cause the computer to function as:

a reception device for receiving the harsh braking information, said harsh braking information including information, which is indicative that the harsh braking has been applied to said harsh braking-applied vehicle, and another information, which is indicative of a position of the harsh braking-applied vehicle;

a position detection device for detecting a position of the vehicle to be warned;

a forward side vehicle judgment device for judging as whether or not said harsh braking-applied vehicle is a preceding vehicle, which drives in front of the vehicle to be warned, on a basis of the position of said harsh braking-applied vehicle and the position of said vehicle to be warned;

a warning device for giving a warning of existence of said harsh braking-applied vehicle to said vehicle to be warned, when it is judged that said harsh braking-applied vehicle is said preceding vehicle; and a distance calculation device for calculating distance between said harsh braking-applied vehicle and said vehicle to be warned, on a basis of the position of said harsh braking-applied vehicle and the position of said vehicle to be warned, wherein said warning device gives the warning at a level, which varies in accordance with said distance, and wherein said harsh braking information further includes another information, which is indicative of a driving velocity of said harsh braking-applied vehicle;

a velocity detection device for detecting a driving velocity of said vehicle to be warned; and a reaching time-calculating device for calculating a period of time required for said vehicle to be warned to reach the position of said harsh braking-applied vehicle, on a basis of the position of said vehicle to be warned, the position of said harsh braking-applied vehicle, the driving velocity of said vehicle to be warned and the driving velocity of said harsh braking-applied vehicle, wherein said warning device gives the warning at a level, which varies in accordance with said period of time.

* * * * *